Aug. 19, 1947.        H. ST. PIERRE        2,426,066
MANUFACTURE OF SOLID-FORGED CHAIN
Filed Nov. 20, 1943
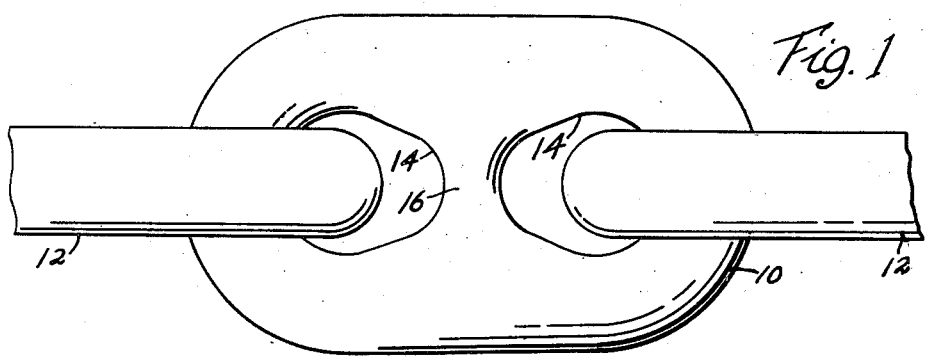
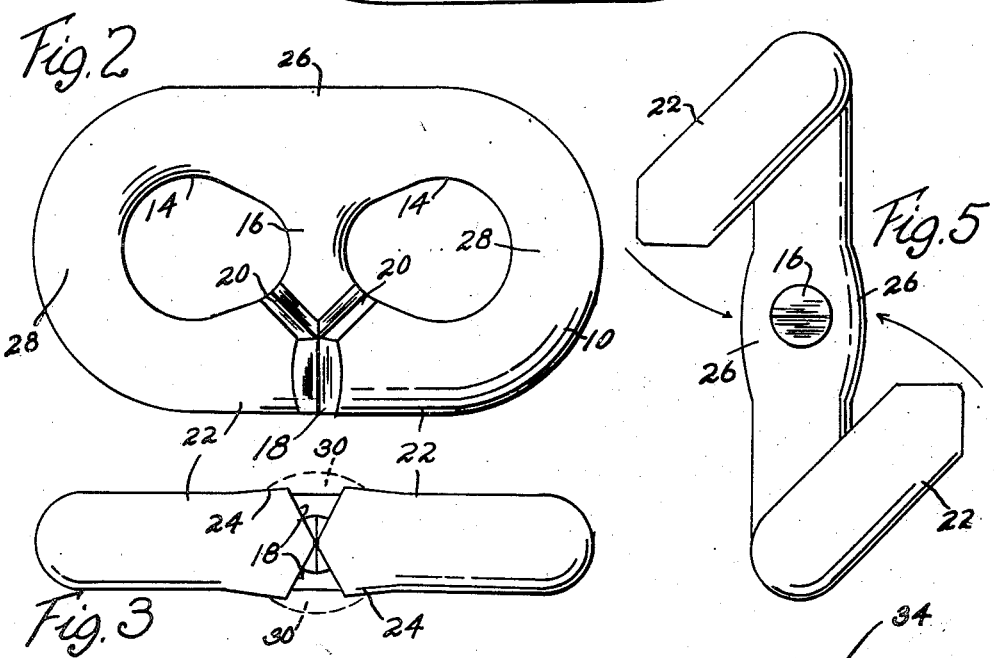
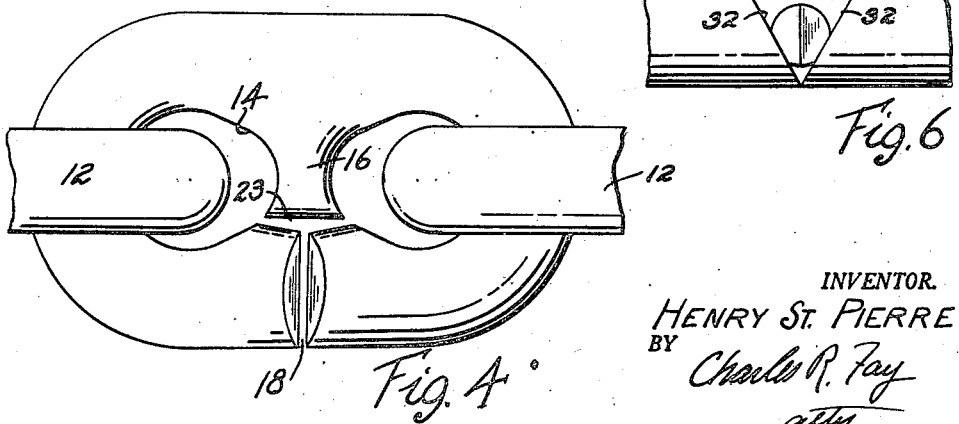
INVENTOR.
HENRY ST. PIERRE
BY Charles R. Fay
atty.

Patented Aug. 19, 1947

2,426,066

UNITED STATES PATENT OFFICE 2,426,066

MANUFACTURE OF SOLID-FORGED CHAIN

Henry St. Pierre, Worcester, Mass.

Application November 20, 1943, Serial No. 511,056

15 Claims. (Cl. 59—35)

This invention relates to "solid-forged" heavy duty chain and methods of making the same, and the principal objects of the invention include the provision of a forged chain joiner link formed initially as a blank having a solid side and an interrupted or split side comprising opposed end elements which are bent or twisted out of the plane of the blank forming an open side run, so that closed or solid links may be inserted over the elements and placed in the open link for the substantially continuous manufacture of "solid-forged" chains, the ends of the link then being bent together to be closed. The link ends are then secured by welding at the junction of the link end elements which now abut or nearly abut, with the deposition or casting of a surplus of molten metal at the weld; the link is then heated at the central portion only or entirely heated and cooled at the ends, placed in a set of dies shaped to final desired form and forged in a hammer at the weld area, the surplus metal and adjacent areas thereby being forged, this action resulting in a completely "solid-forged" joiner link having a pair of solid forged links linked therewith, and also in a refinement of the welding metal and of the chain material forming the weld, as well as an improvement in the weld itself, by reason of the hammer blows used to forge the link; and the provision of "solid-forged" chain link blanks having twisted ends which are closed and welded with the addition of cast surplus metal at the weld, the links then being given a final forging action to complete the link and refine and strengthen the weld area, the chain thus produced being heat treated as a final step to make better chain for heavy duty and having greatly improved strength characteristics per unit of weight.

Other objects and advantages of the invention will appear hereinafter.

Reference is to be had to the accompanying drawings in which

Fig. 1 shows a complete joiner link connecting a pair of solid links and made according to the invention, illustrating the smooth even contour obtained;

Fig. 2 is a plan view of a joiner link blank;

Fig. 3 is an edge view of the blank of Fig. 2;

Fig. 4 is a plan view of a modified blank;

Fig. 5 is a view similar to Fig. 3 but showing the free ends of the joiner blank twisted; and Fig. 6 is an edge view of a modified construction.

This application is a continuation in part of my application Serial No. 449,931 filed July 6, 1942, Pat. No. 2,368,271, and in general the chain of this application is very similar in its finished form to the chain disclosed in the above named application. This application shows stud links for purposes of more complete illustration and whereas the stud link is the main consideration, still the invention applies also to plain links without the studs.

The most efficient and strongest chain heretofore produced is that known as the "die-lock" which is manufactured at the United States Navy Yard in Boston, Massachusetts, U. S. A. The main objection to the "die-lock" chain is the fact that it can be heat treated only in the male part, and another objection is that every link in the chain must be made the same, and each link must be added to the chain singly instead of manufacturing by triplets or doublets.

According to U. S. Navy specifications the "die-lock" chain has a breaking load of 75,000 lbs. when nickel steel is used. The present chain at the same size and weight will reach a breaking load of 100,000 lbs. or better when using S. A. E. 1330 steel. The present invention is directed to a continuous chain which can be heat-treated and which can be assembled in triplets or doublets by using alternate solid links and joiner links, the invention being directed mainly however to the joiner links.

In Fig. 1 there is shown a section of chain including a joiner link shown in plan at 10 and connecting a pair of solid links of similar size and shape as indicated at 12. There will be a joiner link 10 alternating with each solid link 12 and the joiner links appear exactly like the solid links when the chain is finished and ready to be used.

In the present illustration of the invention all of the links have eyes 14 for accommodating the ends of the connected links, and a stud 16 for resisting the tendency of the chain to contract along its minor axis under tension. The minor axis is taken through the center of the stud and parallel thereto, and the major axis is at right angles thereto midway of the long sides of the link.

The solid links are forged directly from bars, rods, ingots, etc., and the forging operation results in the usual improvement of the grain structure of the steel. In a stud chain, the links will appear in the form of figure 8's. The joiner links 10 are also forged from solid stock in the form of a figure 8 as shown in Fig. 2, but with depressions as at 18 and 20, the depressions 18 extending from the outer aspect of a long side of the blank inwardly along the minor axis; and the depressions 20 lie at angles thereto and adjoin the depressions 18 with the eyes 14. The depressions 18 and 20 may be forged in the original forging operation as by ribs in the dies, or the depressions may be made only partially and then the link may be cut to deepen and complete the depression. In any case the link blank as shown in Figs. 2 and 3 is provided with depressions 18, 20 complementary to each other at opposite sides thereof and the depressions may be complete so as to form a split, resulting in ends 22 which may be separated, or if desired the depressions may stop slightly short of extending completely through the blank, the twisting or bending operation to be later described serving to disrupt any small fin at the bottoms of the depressions so that the ends 22 are easily separable.

It is preferred that the area of the link in the region of the depression should have a somewhat greater section as shown at 24 than the remainder of the link, although it is contemplated that the opposite area of the blank in the region indicated by the reference character 26 may also be enlarged in the original forging operation to correspond with the enlargement at 24. In any event depressions 18 and 20 will be seen to form a means by which the ends 22 may be separated both from each other and from the stud 16. The Y-shape of depressions 18 and 20 is but one conformation used, it being obvious that if the stud 16 were not present the depression 18 would extend across the long run and there would be no necessity for the depression 20. Also depression 20 may be of other formations, see Fig. 4 at 23, and the invention is not limited to the shapes shown.

Once the blank has been formed as shown in Figs. 2 and 3 it is placed in a clamping device at the area 26 which leaves the rest of the link free for the twisting operation which may be done in any desired or convenient manner. The ends 22 are twisted hot on axes parallel to the minor axis as above defined but spaced therefrom at each side thereof and located in the short ends 28 of the blank so that the link then appears as shown in Fig. 25. The ends 22 can be twisted to either side of the major axis of the link, but it is found more convenient to twist one end to one side and the other end to the other side rather than twisting both ends to the same side of the major axis. While the link is in the condition shown in Fig. 5 a solid figure 8 link is slipped over each end 22 and the latter are then twisted back to original Fig. 3 position as indicated by the arrows in Fig. 5. The joiner link and connected solid links then appear as shown in Fig. 4.

The chain has now been assembled and is ready for the welding operation, it being appreciated that only the joiner links need to be welded, that is, only one-half the links of the chain are welded links. It is preferred to melt a quantity of parent metal or metal similar thereto and to deposit the molten metal in the depressions 18 and 20. The area of the weld may be heated prior thereto so as to produce an increased intermingling of the link metal and the weld metal to form the best weld, and in any case it is preferred that an excess of welding metal be applied as indicated in dotted lines in Fig. 3 at 30 and thus it will be apparent that the weld area is somewhat enlarged as compared with the remainder of the link.

The chain thus far described will present good characteristics and could even be used for the purposes to which the chain is ordinarily put, but the strength of the welded chain will nowhere near reach the desired characteristics and by reason of the construction and method recited it is possible to greatly further improve the chain from several standpoints. The chain is next forged in dies corresponding to the final shape desired and it is preferable to heat and forge the entire central part of the link including the stud. If convenient the entire link may be heated and the ends 28 cooled prior to this forging step or merely the central area of the link can be heated to forging heat. The ends 28 are not forged in the final operation as these ends are already complete and in final form and it is not desired to disturb the condition of the link at the ends. The center of the link being hot and the ends cool the link is placed in the die and it is hammered in the weld area and also at 26 to forge the link to final form in these dies. This forging operation shapes the weld area and also the area 26 to the form desired and refines the weld metal which has in effect been cast. It is well recognized that a cast metal has a grain structure imparting a condition of less toughness to the steel than appears in a forged steel. Hence the forging operation refines the metal of the cast weld and returns the metal of the link affected by the welding heat to a grain character similar to that in the rest of the chain for added toughness and strength. In addition, the weld metal under the hammer blows unites to a greater degree with the metal of the link somewhat in the manner of a plastic blacksmith weld so that this invention presents not only the strength imparted by a cast or atomic weld but also that of a plastic weld, and this operation greatly improves the weld characteristics as well as shaping the link to the desired form as shown in Fig. 1.

The blanks of Fig. 2 are originally forged slightly shorter than the closed solid links 12 but sufficient metal is incorporated by reason of the enlarged areas 24 and 26 and that added by the surplus weld metal at 30. In the final forging operation the central part of the link including the ends 22, stud 15, and area 26 are hot, as above stated, and under the final forge the link will tend to elongate. If the entire link were hot, deformation of the ends 28 would result, but this is avoided by keeping these ends cool, and therefore the elongation of the link occurs only in the central area thereof. In order to carry out this procedure the cavities in the die for the final forge are substantially the length of the solid links 12 and thus slightly longer than the joiner link blank. During the final forging operation the link is allowed to elongate in the central area, thus moving the cool ends of the link to the extent of the cavity and ensuring that the joiner links will be substantially the same size and weight as solid links 12, with, however, no disturbance to the original end portions. By following this procedure there will be no fins in the area of the ends 28 but only in the center of the link where the metal was hot and therefore the final forging operation requires trimming only at the center.

In Fig. 6 there is shown a modified type of forging or cut in the original blank and it will be seen that according to this showing the link is forged or cut from one side only as at 32, and hence the welding operation need be made only at one side of the link as at 34. Otherwise the method is the same as that above described.

The chain is now finished in final form and the result of the above method of manufacture is that it is possible to heat treat the entire chain to obtain greater strength, an operation never before possible in the art of chain making. Standard heat treating operation might be used but it has been found that for a 1330 steel, in the absence of nickel, should be annealed from about 1550 degrees followed by air cooling then reheated and quenched in brine. After that the chain may be tempered, followed by a water quench. However, the invention contemplates the inclusion of any heat treating which will beneficially affect the qualities of the chain. For instance a mere reheating or normalizing to relieve the forging strains in the steel will be of beneficial effect particularly as to the weld.

It is also to be understood that the invention contemplates variations in procedure which will bring about good grade chain in various degrees of strength, usable for different purposes. For instance, the weld may be made without the above described surplus of metal, and then the entire chain maybe normalized only or normalized and that treated without the final forging step. Either procedure, without the final forge, will produce a chain as strong as or stronger than prior chain, but not as good as chain made with the final forge. In the absence of the final forging step the humps 24 may also be omitted in all forms as illustrated in Fig. 6 as to the form there shown.

Having thus described my invention and the advantages thereof I do not wish to be limited to the details herein disclosed, otherwise than as set forth in the claims; but what I claim is:

1. The method of making forged chain comprising the steps of hot forging a closed joiner link blank, hot forming depressions therein defining separable ends, separating the ends while hot, inserting a closed solid link over each end, returning the latter to original position, welding the ends, and reheating the chain.

2. The method of making forged chain comprising forging solid closed links and joiner links, forming depressions in the latter to produce a split in each joiner link, separating the elements of the joiner link defining the split, inserting a closed link over each element, returning the latter to original position, welding, and heat treating the resultant chain.

3. The method of making forged heat treated chain comprising forging a closed joiner link, forming a depression therein defining end portions separable from each other, separating the end portions while hot, inserting a closed solid link over each end portion, returning the latter to original position while hot, welding the end portions together, forging the weld area in a die shaped to the final link shape desired, and heat treating the assembled chain.

4. The method of making forged heat treated chain comprising the steps of forming an open sided joiner link blank, inserting a solid link over each end portion defining the opening, bending the end portions to close the joiner link, welding the end portions together by deposition of molten metal, and heat treating the entire chain.

5. The method of making forged heat treated stud chain comprising the steps of forming a stud joiner link having separate ends defining a split adjacent one end of the stud, inserting a closed solid stud link over each end portion, twisting the end portions to close the joiner link by bringing said end portions into juxtaposition with the stud, welding the stud and both end portions together simultaneously by deposition of molten metal, forging the weld area, and heat treating the entire chain.

6. The method of making forged heat treated chain comprising the steps of forming an open sided joiner link having end portions defining the opening, inserting a closed link over each end portion, closing the joiner link, welding the end portions together by deposition of a surplus of molten metal therebetween, hot forging the welded area in a set of dies conforming to the final desired shape, and thereafter heat treating the entire chain.

7. The method of making forged heat treated stud chain comprising the steps of forming a stud joiner link having a free-ended stud and a pair of end portions defining an open side for the joiner link, inserting a closed stud link over each end portion so that the stud separates the closed links, bending the end portions into juxtaposition to the free end of the stud, depositing a surplus of molten metal at and between said end portions and free end of the stud to weld the same, hot forging the welded area in a die conforming to the shape of a finished link to further weld, shape, and refine the welded area, and finally heat treating the entire chain.

8. The method of making forged chain comprising the steps of forging a joiner link blank having a larger section at the center of a long side than at the ends, joining a pair of closed links therewith, and forging the enlarged area while hot thereby at least partially reducing the same in section.

9. The method of making a forged chain link comprising the steps of forging a joiner link having ends defining an opening in the joiner link at one side thereof, forming an enlarged area in the opposite side of the link, depositing molten metal at and between the ends to weld the same, and hot forging the weld and enlarged area.

10. The method of claim 9 wherein the deposition of molten metal includes a surplus to render the weld area enlarged in section, whereby the forging operation reduces both enlarged areas.

11. The method of making a forged chain link comprising the steps of forging a joiner link having ends defining an opening in a side thereof, forming an enlargement in the side opposite the opening, depositing sufficient molten metal at and between the ends to form a second enlargement, and forging the enlargements while hot to elongate the link.

12. The method of making forged chain comprising the steps of forging a joiner link having spaced ends, inserting a longer closed link over each end of the joiner link, welding the ends together, and elongating the joiner link by forging.

13. The method of making forged chain comprising the steps of forging a joiner link having spaced ends defining an opening in a side of the link, and during the forging enlarging an area of the other side of the link opposite the opening, placing a longer closed link over each end, bringing the ends together, depositing a surplus of weld metal at and between the ends forming an enlargement thereat, and then reducing the enlargements by hot forging the enlarged areas thereby elongating the link while the remainder of the link is cool.

14. The method of making chain comprising the steps of joining a pair of closed solid links to a shorter joiner link having enlargements in the central areas of both long sides thereof, placing the joiner link in a die having a cavity comparable in length to the closed links, and forging the central enlarged areas while hot to reduce the enlargements and elongate the joiner link to conform to the cavity, the ends of the joiner link being cool and undisturbed by the forging operation.

15. The method of making forged heat treated stud chain comprising the steps of forming a stud joiner link having separate ends defining a split adjacent one end of the stud, inserting a closed solid stud link over each end portion, twisting the end portions to close the joiner link by bringing said end portions into juxtaposition with the stud, welding the stud and both end portions together, and heat treating the entire chain.

HENRY ST. PIERRE.

REFERENCES CITED

The following references are of record in the file of this patent:

UNITED STATES PATENTS

| Number | Name | Date |
|---|---|---|
| 2,021,157 | Stahl | Nov. 19, 1935 |
| 2,260,630 | McKinnon et al. | Oct. 28, 1941 |
| 2,292,637 | Hendrickson | Aug. 11, 1942 |

FOREIGN PATENTS

| Number | Country | Date |
|---|---|---|
| 273,343 | Great Britain | Dec. 8, 1927 |
| 421,705 | Germany | Nov. 17, 1925 |